United States Patent [19]

Sunada et al.

[11] 4,179,417

[45] Dec. 18, 1979

[54] COMPOSITION FOR WATER-BASE PAINT COMPRISING WATER-SOLUBLE RESIN AND WATER-DISPERSIBLE POLYMER

[75] Inventors: Masuyuki Sunada, Chiba; Hirotugu Takanashi, Tateyama; Hidenobu Ishikawa, Chiba; Akikazu Takahashi, Matsudo; Fumio Yoshino, Ichihara, all of Japan

[73] Assignee: Dainippon Ink & Chemicals Inc., Tokyo, Japan

[21] Appl. No.: 810,076

[22] Filed: Jun. 27, 1977

[30] Foreign Application Priority Data

Dec. 17, 1976 [JP] Japan .................. 51/150759

[51] Int. Cl.² .......................... C09D 3/52; C09D 3/58; C09D 3/76; C09D 5/02

[52] U.S. Cl. .................. 260/18 EP; 260/21; 260/22 CB; 260/23 P; 260/23 TN; 260/29.2 TN; 260/29.2 UA; 260/29.2 EP; 260/29.4 UA

[58] Field of Search .............. 260/22 CB, 29.2 TN, 260/29.2 UA, 29.2 EP, 23 P, 18 EP, 23 TN, 23 EP, 21, 29.4 UA

[56] References Cited

U.S. PATENT DOCUMENTS

| | | | |
|---|---|---|---|
| 2,530,315 | 11/1950 | Rust et al. | 260/22 CB |
| 2,915,486 | 12/1959 | Shelley | 260/22 CB |
| 3,258,438 | 6/1966 | Shaw et al. | 260/22 CB |
| 3,287,292 | 11/1966 | Dalibor | 260/22 CB |
| 3,306,866 | 2/1967 | Percival et al. | 260/22 CB |
| 3,433,753 | 3/1969 | Farkas et al. | 260/22 CB |
| 3,726,819 | 4/1973 | Dijkhuizen | 260/22 CB |
| 3,847,851 | 11/1974 | Tugukuni et al. | 260/22 CB |
| 3,862,071 | 1/1973 | Di Carlo | 260/29.4 UA |

*Primary Examiner*—Ronald W. Griffin
*Attorney, Agent, or Firm*—Sherman & Shalloway

[57] ABSTRACT

A composition for water-base paints, said composition comprising (I) a water-soluble resin, and (II) a water-dispersible polymer containing at least one group selected from the class consisting of hydroxyl and carboxyl groups, said water-soluble resin being obtained by polymerizing 50 to 99.5% by weight of an alkyl ester of an $\alpha,\beta$-monoethylenically unsaturated acid or an alkenyl benzene, 0.5 to 20% by weight of an $\alpha,\beta$-monoethylenically unsaturated acid and 0 to 30% by weight of a hydroxyalkyl ester of an $\alpha,\beta$-monoethylenically unsaturated acid in the presence of at least one unsaturated compound selected from the group consisting of alkyd resins containing a polymerizable unsaturated group, epoxy esters containing a polymerizable unsaturated group, drying oils, fatty acids of drying oils and diene polymers, and water-solubilizing the product with ammonia or an amine.

18 Claims, No Drawings

COMPOSITION FOR WATER-BASE PAINT COMPRISING WATER-SOLUBLE RESIN AND WATER-DISPERSIBLE POLYMER

This invention relates to a composition for water-base paints which comprises a water-soluble resin and a water-dispersible polymer.

Water-base paints have attracted great attention because they contain water as a main medium and thus have the advantage of saving resources and not causing pollution. Vehicles used heretofore in water-base paints are of two types, one being water-soluble vehicles obtained by neutralization of vehicles with ammonia, amines, etc. and the other being water-dispersible vehicles typified by polymer emulsions. It is known that coated films obtained from these vehicles have almost contradictory properties. Coated films obtained from the water-soluble vehicles have superior gloss and rust-proofness, but inferior physical properties. On the other hand, coated films obtained from the water-dispersible vehicles have superior physical properties but inferior gloss and rust-proofness. An idea would readily occur of mixing these two vehicles to set off their defects. However, the conventional water-soluble vehicles and water-dispersible vehicles usually have poor compatibility with each other, and therefore can hardly be mixed in varying proportions. Even if they can be mixed with each other, the resulting mixture has reduced storage stability because the individual vehicles have poor storage stability. Such a mixture is therefore not feasible for practical application.

It is an object of this invention to provide a composition for water-base paints, which can afford coated films having superior gloss, rust-proofness and physical properties.

Another object of this invention is to provide a composition for water-base paints, which contains a water soluble resin and a water-dispersible polymer having good compatibility with each other, and has superior storage stability.

Still another object of this invention is to provide a non-baking (that is, air drying or forced drying) curable composition for water-base paints, which comprises a water-soluble resin and a water-dispersible polymer.

A further object of this invention is to provide a composition for baking curable water-base paints, which consists of a water-soluble resin, a water-dispersible polymer and a cross-linking component.

These objects of the invention are achieved by a composition for water-base paints, comprising (I) a water-soluble resin, and (II) a water-dispersible polymer containing at least one group selected from the class consisting of hydroxyl and carboxyl groups, and optionally (III) at least one crosslinking component selected from the group consisting of amino resins, blocked isocyanate compounds and epoxy resins, the water-soluble resin (I) being obtained by polymerizing 50 to 99.5% by weight of an $\alpha,\beta$-monoethylenically unsaturated acid alkyl ester or an alkenyl benzene, 0.5 to 20% by weight of an $\alpha,\beta$-monoethylenically unsaturated acid and 0 to 30% by weight of a hydroxyalkyl ester of $\alpha,\beta$-monoethylenically unsaturated acid in the presence of at least one unsaturated compound selected from the group consisting of alkyd resins containing a polymerizable unsaturated group, epoxy esters containing a polymerizable unsaturated group, drying oils, fatty acids of drying oils, and diene polymers, and water-solubilizing the product with ammonia or an amine.

The unsaturated compound, one of the starting materials, contains a polymerizable unsaturated bond. The unsaturated bond is of two types, one derived from the structure of the drying oil fatty acid or diene polymer, and the other derived from the structure of a polymerizable unsaturated dibasic acid such as maleic acid, itaconic acid, or fumaric acid. The unsaturated compound having a polymerizable unsaturated bond participates to some extent in the polymerization of the ethylenically unsaturated monomers and serves to modify the polymer.

When a compound having a structure of a drying oil fatty acid or a diene polymer is used in order to introduce an unsaturated bond, a part of the unsaturated bond is consumed by the polymerization reaction, and the remainder is introduced into the water-soluble resin. As a result, a composition obtained by mixing the water-soluble resin with the water-dispersible polymer is non-baking and cures upon drying, and the resulting cured coating has superior flexibility. This effect is especially outstanding when a drying oil, a drying oil fatty acid or a diene polymer is used as the unsaturated compound.

The alkyd resins include those which are modified with drying oils or non-drying oils, and oil-free alkyd resins. They can be obtained by reacting alcohols, carboxylic acids, and optionally oil-modifying materials in a known manner. Suitably, the solid of the alkyd resin has an acid value of not more than 200. There is no particular restriction on the hydroxyl value of the alkyd resins, but when a hydroxyl-reactive crosslinking component is used, the alkyd resin preferably has a hydroxyl value of at least 50. Examples of the alcohols as raw materials of the alkyd resins include glycerol, trimethylolethane, trimethylolpropane, pentaerythritol, ethylene glycol, propylene glycol and neopentyl glycol. Examples of the carboxylic acids are phthalic acid, isophthalic acid, terephthalic acid, trimellitic acid, glutaric acid, adipic acid, maleic acid, and fumaric acid. Examples of the oil-modifying materials include linseed oil, safflower oil, tung oil, dehydrated castor oil, soybean oil, cotton seed oil, rice bran oil, coconut oil, fatty acids of these oils, tall oil fatty acid, and products obtained by treating these oils or fatty acids with the unsaturated dibasic acids described (for example, maleinized safflower oil fatty acid). The suitable amount of the oil-modifying material is usually 10 to 80%, preferably 30 to 70%, as oil length.

The epoxy ester includes epoxy esters of drying oil fatty acids and non-drying oil fatty acids. The epoxy ester is obtained by reacting in a known manner a polyepoxide with a fatty acid as the oil-modifying material described above, optionally further with an unsaturated dibasic acid. The fatty acid content is usually 10 to 80% by weight, preferably 30 to 70% by weight. Bisphenol-type diepoxide obtained by reacting ($\beta$-methyl) epichlorohydrin with bisphenol A is most preferred as the polyepoxide. Other useful polyepoxides include fatty acid ether-type diepoxides such as ethylene glycol di($\beta$-methyl) glycidyl ether and polypropylene glycol di($\beta$-methyl) glycidyl ether, and ester-type diepoxides such as di($\beta$-methyl) glycidyl phthalate and di($\beta$-methyl) glycidyl tetrahydrophthalate.

The oil-modifying materials described can, of course, be used as the unsaturated compound.

Examples of the diene polymer include polymers of dienes such as polybutadiene and polypentadiene preferably having a number average molecular weight of 800 to 2,000, products obtained by introducing a hydroxyl group and/or a carboxyl group into these diene polymers, and products obtained by treating these diene polymers with the unsaturated dibasic acids described.

According to the present invention, specified ethylenically unsaturated monomers are polymerized in the presence of the saturated compound. Specifically, the monoethylenically unsaturated monomers are a mixture consisting of (1) 50 to 99.5% by weight, preferably 65 to 95% by weight, of an alkyl ($C_1$–$C_8$) ester of an $\alpha,\beta$-monoethylenically unsaturated carboxylic acid, or an alkenyl ($C_2$–$C_3$) benzene, (2) 0.5 to 20% by weight, preferably 5 to 15% by weight, of an $\alpha,\beta$-monoethylenically unsaturated carboxylic acid, and (3) 0 to 30% by weight (8 to 20% by weight when a hydroxyl-reactive crosslinking component (III) is used) of a hydroxyalkyl ($C_2$–$C_4$) ester of an $\alpha,\beta$-monoethylenically unsaturated carboxylic acid.

The weight ratio of the unsaturated compound and the monomeric mixture is usually 90:10 to 20:80, preferably 70:30 to 30:70. In view of the desired properties of a coated film to be prepared from the composition of this invention, it is desirable to adjust the weight ratio so that the solids of the resulting polymerization product have an acid value of not more than 200, preferably 20 to 100, and a hydroxyl value of not more than 300, preferably not more than 150 (at least 50 when a hydroxyl-reactive crosslinking component (III) is used). It should be noted that the acid value and the hydroxyl value are affected not only by the functional groups of the ethylenically unsaturated monomers but also by the functional groups of the unsaturated compound.

Examples of the alkyl ($C_1$–$C_8$) ester of an $\alpha,\beta$-monoethylenically unsaturated carboxylic acid include methyl (meth)acrylate, ethyl (meth)acrylate, butyl (meth)acrylate, 2-ethylhexyl (meth)acrylate, and diethyl maleate, and examples of the alkenyl ($C_2$–$C_3$) benzene include styrene and vinyl toluene.

Examples of the $\alpha,\beta$-monoethylenically unsaturated carboxylic acid (2) include (meth)acrylic acid, maleic acid, fumaric acid, and itaconic acid. The monomer (2) serves to aid in the water-solubilization of the polymerization product and increase the storage stability of the composition of this invention, and also to inroduce a crosslinking functional group.

Examples of the hydroxyalkyl ($C_2$–$C_4$) ester of an $\alpha,\beta$-monoethylenically unsaturated carboxylic acid include 2-hydroxyethyl (meth)acrylate, and 2-hydroxypropyl (meth)acrylate. The monomer (3) serves to introduce a crosslinking functional group. Hence, when a hydroxyl-reactive compound is used as the crosslinking component (III), the amount of the monomer (3) is preferably 8 to 20% by weight.

The monomeric mixture described is heated together with a polymerization catalyst and a water-miscible organic solvent to 60° to 140° C. to form a polymer. The polymerization catalyst includes, for example, benzoyl peroxide, t-butyl perbenzoxiate, di-t-butyl peroxide, t-butyl peroxy-2-ethylhexanoate, cumene hydroperoxide, and azobisisobutyronitrile. Examples of the water-miscible organic solvent are readily water-soluble organic solvents such as propanol, isopropanol, methyl "Cellosolve" (a trademark for ethylene glycol monomethyl ether), and butyl "Cellosolve" (a trademark for ethylene glycol monobutyl ether), and mixtures of these with a small amount of moderately water-soluble organic solvents such as butanol.

The reaction product obtained is neutralized with ammonia or an amine such as triethylamine, diethlamine, monoethylamine, trimethylamine, dimethyl ethanolamine, isopropanolamine, triethanolamine or monoethanolamine to afford the water-soluble resin (I).

The water-dispersible polymer (II) to be mixed with the water-soluble resin (I) is obtained by emulsion polymerization of an $\alpha,\beta$-monoethylenically unsaturated acid and/or a hydroxyalkyl ester of an $\alpha,\beta$-monoethylenically unsaturated acid with an ethylenically unsaturated monomer in a known manner. The carboxyl group and hydroxyl group as polar groups in the water-dispersible polymer (II) serve to increase the compatibility and storage stability of the composition of the present invention, and the carboxyl group is especially effective. Since the hydroxyl group and carboxyl group act as a crosslinking functional group when the crosslinking component (III) is used, the water-dispersible polymer (II) must contain either one or both of the carboxyl and hydroxyl groups according to the type of the crosslinking component (III). For this reason, when a hydroxyl-reactive compound is used as the crosslinking component (III), it is preferred for the water-dispersible polymer (II) to contain both of these functional groups. The carboxyl content of the water-dispersible polymer (II), in terms of the proportion of the $\alpha,\beta$-monoethylenically unsaturated acid in the entire monomers, is preferably 0.5 to 10%, more preferably 0.8 to 5%, by weight. The hydroxyl content of the polymer (II) in terms of the proportion of the $\alpha,\beta$-monoethylenically unsaturated acid hydroxyalkyl ester, is preferably 0.5 to 20% by weight [preferably 8 to 20% by weight when a hydroxyl-reactive compound is used as the cross-linking component (III)].

Acrylic copolymers are most suitable as the water-dispersible polymer (II). The monomer constituents, excepting polar group-containing monomer, are a mixture of a hard monomer typified by methyl methacrylate, styrene and vinyltoluene and a soft monomer typified by ethyl acrylate and butyl acrylate. The preferred weight ratio of the soft monomer to the hard monomer is 30:70 to 80:20. Butadiene copolymers can also be suitably used as the water-dispersible polymer (II). The preferred monomer constituents, excepting polar group-containing monomers, are a mixture of a hard monomer typified by styrene and methyl methacrylate and butadiene in a weight ratio of 30:70 to 80:20.

The composition of this invention consists essentially of the water-soluble resin (I) and the water-dispersible polymer (II). The amount of the water-dispersible polymer (II) is 10 to 900 parts by weight, preferably 40 to 250 parts by weight, more preferably 70 to 110 parts by weight, per 100 parts by weight of the water-soluble resin (I) calculated as solids. Mixing of these polymers can be achieved by gradually adding the aqueous solution of water-soluble resin (I) as formed from the water-solubilizing step or after further diluting it with water to an emulsion of the water-dispersible polymer (II).

The composition of this invention composed of the water-soluble resin (I) and the water-dispersible polymer (II) can be used as a non-baking (i.e., air drying or forced drying) curable water-base paint by adding a metal dryer. Cobalt naphthenate, lead naphthenate, zirconium naphthenate, calcium naphthenate, etc. can be used as the metal dryer. The suitable amount of the metal dryer is 0.05 to 0.5 part, calculated as metal, per 100 parts by weight of the solids of the water-soluble resin (I) in the composition.

A composition in accordance with another embodiment of this invention which consists of the water-soluble resin (I), the water-dispersible polymer (II) and the crosslinking component (III) can be used as a baking curable paint. The crosslinking component (III) includes hydroxyl-reactive compounds such as amino resins and blocked isocyanate compounds and carboxyl-reactive compounds such as epoxy resins. Of these, amino resins such as a methyl-etherified melamine resin or methylbutyl-etherified melamine resin are most preferred. The amount of the crosslinking component (III) is 5 to 65 parts by weight, especially 10 to 35 parts by weight per 100 parts by weight of the total solids of the water-soluble resin (I) and the water-dispersible polymer (II).

The following Examples illustrate the present invention in more detail.

EXAMPLE 1

A mixture of 158 parts of dehydrated castor oil fatty acid, 71 parts of trimethylolethane, 102 parts of phthalic anhydride and 10 parts of trimellitic anhydride was heated at 180° C. for 10 hours in the presence of an inert gas to afford an alkyd resin whose solids had an acid value of 35. A mixture consisting of 100 parts of the alkyd resin and 70 parts of methyl "Cellosolve" was maintained at 80° C., and a mixture consisting of 1 part of azobisisobutyronitrile, 70 parts of styrene, 20 parts of methyl methacrylate and 10 parts of methacrylic acid was added dropwise to the heated mixture. After the addition, the mixture was maintained at the same temperature for 3 hours, and rapidly cooled (whereupon the solids had an acid value of 45). Then, 20 parts of triethylamine was added to form a water-soluble resin (A).

A mixture of 90 parts of distilled water and 2 parts of sodium laurylsulfate was maintained at 70° C. in the presence of an inert gas, and a mixture consisting of 50 parts of styrene, 47 parts of ethyl acrylate and 3 parts of acrylic acid was added dropwise. Simultaneously, a mixture consisting of 0.2 part of ammonium sulfate and 10 parts of distilled water was also added dropwise. The mixture was maintained at this temperature for 3 hours and then cooled. 3 parts of 25% ammonia solution was added to afford an emulsion copolymer (A).

72 parts of the water-soluble resin (A) was gradually added to a stirred mixture of 100 parts of the emulsion copolymer (A) and 50 parts of distilled water. They were mixed uniformly to afford a composition having a solids content of 45% and a viscosity, measured at 25° C. (all viscosities given hereinafter were measured at 25°), of 3,500 centipoises.

Carbon black was added to the resulting composition to prepare a black enamel having a PWC (Pigment Weight Concentration) 5%. To 100 parts of the enamel was added 0.6 part of 5% cobalt naphthenate. The mixture was coated on a mild steel panel, and allowed to stand at 20° C. In 30 minutes, the coating set and became solid to the touch, and in 10 hours, completely cured to become tack-free.

The coated film obtained at the end of 24 hours had superior properties as shown in Table 1.

Table 1

| 60° Specular gloss | 94 |
|---|---|
| Pencil hardness | F |

Table 1-continued

| Impact resistance | more than 50 cm |
|---|---|
| Erichsen | 6.2 mm |
| Water resistance* | no change |
| Gasoline resistance* | no change |
| Salt spray resistance* | 2 mm |

*See the test methods given hereinbelow.

In order to evaluate the storage stability of the black enamel obtained (a metal dryer added), changes in the viscosity of the enamel were examined after storage at 40° C. using a Stomer viscometer at 25° C. The results are shown in Table 2. For comparison, a commercially available emulsion paint and a commercially available water-soluble alkyd resin paint were tested in the same way, and the results are also shown in Table 2.

Table 2

| | Example 1 | Emulsion paint | Water-soluble alkyd resin paint |
|---|---|---|---|
| Initial viscosity (KU) | 62 | 81 | 81 |
| Viscosity (KU) after 1 week | 57 | 112 | 80 |
| Appearance after 1 week | no change | no change | no change |
| Viscosity (KU) after 2 weeks | 59 | 250 | unmeasurable |
| Appearance after 2 weeks | no change | no change | separated |
| Viscosity (KU) after 3 weeks | 57 | unmeasurable | |
| Appearance after 3 weeks | no change | flocculated | |
| Viscosity (KU) after 4 weeks | 57 | unmeasurable | |
| Appearance after 4 weeks | no change | flocculated | |

EXAMPLE 2

A mixture of 90 parts of distilled water, 0.2 part of sodium laurylsulfate, 50 parts of styrene, 5 parts of acrylic acid, 45 parts of butadiene and 1 part of n-dodecyl mercaptan was maintained at 70° C. in the presence of an inert gas, and 0.2 part of potassium persulfate and 10 parts of distilled water were added. The mixture was maintained at the same temperature for 24 hours, and cooled. Then, 4 parts of 25% ammonia solution was added to afford an emulsion copolymer (B).

Seventy-two (72) parts of the water-soluble resin (A) obtained in Example 1 was gradually added to a stirred mixture of 100 parts of the copolymer (B) and 50 parts of distilled water, and they were uniformly mixed to afford a composition having a solids content of 45% and a viscosity of 2,000 centipoises.

The resulting composition had much the same properties as the composition obtained in Example 1.

EXAMPLE 3

A mixture consisting of 200 parts of safflower oil fatty acid, 200 parts of a bisphenol-type epoxy resin solid (epoxy equivalent 450, melting point 70° C.) and 5 parts of fumaric acid was heated at 200° C. for 8 hours in the presence of an inert gas to afford an epoxy ester whose solids had an acid value of 20. Butyl "Cellosolve" (70 parts) was added to 100 parts of the epoxy ester, and the mixture was maintained at 100° C. A mixture consisting of 2 parts of benzoyl peroxide, 20 parts of ethyl acrylate, 23 parts of vinyl toluene and 7 parts of methacrylic acid was added dropwise to the heated mixture. After the addition, the mixture was maintained at the same temperature for 4 hours, and then cooled. Triethylamine (13 parts) and 69 parts of distilled water were added to afford a water-soluble resin (B).

The resulting water-soluble resin (B) was gradually added to a stirred mixture of 100 parts of the emulsion copolymer (A) obtained in Example 1 and 38 parts of distilled water to afford a composition having a solids content of 40% and a viscosity of 1,000 centipoises.

The composition had much the same properties as the composition obtained in Example 1.

EXAMPLE 4

A mixture consisting of 100 parts of the alkyd resin obtained in Example 1 and 70 parts of methyl "Cellosolve" was maintained at 80° C., and a mixture consisting of 1 part of azobisisobutyronitrile, 55 parts of styrene, 20 parts of methyl methacrylate, 15 parts of β-hydroxyethyl methacrylate and 10 parts of methacrylic acid was added dropwise to the heated mixture. After the addition, the mixture was maintained at the same temperature for 3 hours, and rapidly cooled (whereupon the solids had an acid value of 45). Then, 20 parts of triethylamine was added to afford a water-soluble resin (C).

A mixture consisting of 90 parts of distilled water and 2 parts of sodium laurylsulfate was maintained at 70° C. in the presence of an inert gas, and a mixture consisting of 40 parts of styrene, 47 parts of ethyl acrylate, 3 parts of acrylic acid, and 10 parts of β-hydroxyethyl methacrylate was added dropwise to the heated mixture. Simultaneously, a mixture consisting of 0.2 part of ammonium persulfate and 10 parts of distilled water was also added dropwise. The mixture was maintained at this temperature for 3 hours, and cooled. Then, 3 parts of 25% ammonia solution was added to afford an emulsion copolymer (C).

Seventy-two (72) parts of the water-soluble resin (C) was added gradually to a stirred mixture of 100 parts of the emulsion copolymer and 50 parts of distilled water, and they were mixed uniformly to afford a composition having a solids content of 45% and a viscosity of 3,500 centipoises.

A solution of a water-soluble methyl-etherified melamine resin (solids content 65%) was added to the resulting composition with the solids ratio of the former to the latter being adjusted to 15/85), and titanium dioxide was further added to form a white paint (PWC 40%). The paint was coated on a mild steel panel, and baked at 120° C. for 20 minutes. The coated film obtained had superior properties as shown in Table 3.

Table 3

| 60° Specular gloss | 92 |
| --- | --- |
| Pencil hardness | H-2H |
| Impact resistance | more than 50 cm |
| Erichsen | 6 mm |
| Water resistance | no change |
| Gasoline resistance | no change |
| Salt spray resistance | 2 mm |

EXAMPLE 5

A mixture consisting of 193 parts of coconut oil fatty acid, 192 parts of trimethylolpropane, 98 parts of phthalic anhydride, 42 parts of adipic acid and 15 parts of maleic anhydride was heated at 180° C. for 8 hours in the presence of an inert gas to afford an alkyd resin whose solids had an acid value of 40. A mixture of 100 parts of the alkyd resin and 70 parts of butyl "Cellosolve" was maintained at 130° C., and a mixture consisting of 1.7 parts of t-butyl peroxybenzoate, 17 parts of styrene, 2.8 parts of acrylic acid, 17 parts of methyl methacrylate and 3.9 parts of β-hydroxyethyl methacrylate was added dropwise to the heated mixture. After the addition, the mixture was maintained at the same temperature for 4 hours, and rapidly cooled. Then, 10.5 parts of triethylamine was added to afford a water-soluble resin (D).

Sixty-seven (67) parts of the water-soluble resin (C) was gradually added to a stirred mixture of 100 parts of the emulsion copolymer (C) obtained in Example 4 and 38 parts of distilled water, and they were uniformly mixed to afford a composition having a solids content of 45% and a viscosity of 4,500 centipoises.

The composition had much the same properties as the composition obtained in Example 4.

EXAMPLE 6

A mixture of 100 parts of dehydrated castor oil fatty acid and 70 parts of butyl "Cellosolve" was heated at 100° C., and a mixture of 2 parts of benzoyl peroxide, 80 parts of styrene, 20 parts of methyl methacrylate, 13.3 parts of acrylic acid and 0.45 part of lauryl mercaptan was added dropwise to the heated mixture. The resulting mixture was maintained at the same temperature for 4 hours, and then cooled. Triethylamine (44 parts) and 125 parts of distilled water were added to afford a water-soluble resin (E).

A mixture of 90 parts of distilled water and 0.2 part of sodium laurylsulfate was heated to 70° C., and a mixture consisting of 60 parts of styrene, 38 parts of n-butyl acrylate, 2 parts of acrylic acid and 1 part of lauryl mercaptan was added dropwise to the heated mixture. Simultaneously, a mixture consisting of 0.2 part of calcium persulfate and 10 parts of distilled water was also added dropwise. The mixture was maintained at the same temperature for 4 hours, and its pH was adjusted to 8.0 with ammonia solution to afford an emulsion copolymer (D).

To a mixture of 100 parts of the emulsion copolymer (D) and 22 parts of distilled water was added dropwise 100 parts of the water-soluble resin (E). The resulting composition was milk white, and had a viscosity of 5,000 centipoises, a solids content of 45%, and a pH of 8.5.

EXAMPLE 7

A mixture of 100 parts of polypentadiene (number average molecular weight 900, iodine value 370) and 70 parts of butyl "Cellosolve" was heated to 100° C., and a mixture consisting of 5 parts of benzoyl peroxide, 50 parts of styrene, 40 parts of methyl methacrylate, 10 parts of n-butyl methacrylate and 15 parts of methacrylic acid was added dropwise to the heated mixture. The mixture was maintained at the same temperature for 4 hours, and cooled. A mixture of 18 parts of triethylamine and 127 parts of distilled water was added to afford a water-soluble resin (F).

A mixture consisting of 90 parts of water, 0.2 parts of sodium laurylsulfate, 25 parts of styrene, 25 parts of methyl methacrylate, 3 parts of methacrylic acid, 1 part of β-hydroxyethyl methacrylate, 46 parts of butadiene and 1 part of n-dodecyl mercaptan was heated to 70° C. in an atmosphere of an inert gas, and a mixture of 0.2 part of calcium persulfate and 100 parts of distilled water was added. The resulting mixture was maintained at the same temperature for 24 hours, and cooled. The pH of the mixture was adjusted to 8.0 with ammonia solution to afford an emulsion copolymer (E).

To a mixture of 100 parts of the water-soluble resin (F) and 34 parts of distilled water was gradually added 200 parts of the emulsion copolymer (E), and they were mixed with each other. The resulting composition was milky white, and had a viscosity of 7.000 centipoises, a solids content of 45%, and a pH of 8.8.

EXAMPLE 8

Five hundred (500) parts of polybutadiene (number average molecular weight 1,000 iodine value 405) was heated to 150° C. in an atmosphere of an inert gas, and 50 parts of maleic anhydride was added. The mixture was heated to 220° C., and maintained at this temperature for 3 hours. Then, butyl "Cellosolve" was added to adjust the solids content of the mixture to 60%. Five hundred (500) parts of the maleinized polybutadiene was heated to 100° C., and a mixture consisting of 5 parts of benzoyl peroxide, 100 parts of styrene, 50 parts of methyl methacrylate, 33 parts of ethyl methacrylate and 17 parts of methacrylic acid was added dropwise. The mixture was maintained at the same temperature for 4 hours, and cooled. Triethylamine (76 parts) and 57 parts of distilled water were added to afford a water-soluble resin (G).

To a mixture of 100 parts of the water-soluble resin (G) and 45 parts of distilled water was added gradually 100 parts of the emulsion copolymer (D) obtained in Example 6, and they were mixed with each other. The resulting composition was milky white, and had a viscosity of 9.000 centipoises, a solids content of 45%, and a pH of 9.0.

Carbon black was added to each of the compositions obtained in Examples 6 to 8 to prepare black enamels (PWC 5%). The storage stability (the time in seconds measured at 25° C. by a Ford cup No. 4 after the black enamel was stored for long periods of time at 40° C.) of each of the black enamels was determined, and the results are shown in Table 4.

To the black enamel was added 1.5%, based on the solids of the resin, of 5% cobalt naphthenate. The resulting mixture was coated on a mild steel panel, and allowed to stand at 20° C. for 24 hours. The properties of the resulting cured coating are shown in Table 5.

Table 4

| Example | 6 | 7 | 8 |
|---|---|---|---|
| Initial viscosity | 40 | 41 | 41 |
| Viscosity after 1 week | 38 | 40 | 41 |
| Appearance after 1 week | no change | no change | no change |
| Viscosity after 2 weeks | 39 | 40 | 40 |
| Appearance after 2 weeks | no change | no change | no change |
| Viscosity after 3 weeks | 37 | 38 | 43 |
| Appearance after 3 weeks | no change | no change | no change |
| Viscosity after 4 weeks | 36 | 36 | 47 |
| Appearance after 4 weeks | no change | no change | no change |

Table 5

| Example | 6 | 7 | 8 |
|---|---|---|---|
| Setting to touch (20° C., min.) | 20 | 15 | 15 |
| Tack-free (20° C., min.) | 40 | 35 | 30 |
| 60° Specular gloss | 95 | 93 | 95 |
| Sward hardness | 18 | 20 | 20 |
| Impact resistance | over 50 cm | over 50 cm | over 50 cm |
| Water resistance* | no change | no change | no change |
| Salt spray resistance* | 2 mm | 2 mm | 0.5 mm |

Table 5-continued

| Example | 6 | 7 | 8 |
|---|---|---|---|
| Gasoline resistance* | no change | no change | no change |

*See the test methods described hereinbelow.

EXAMPLE 9

A mixture of 100 parts of dehydrated castor oil fatty acid and 70 parts of butyl "Cellosolve" was heated to 100° C., and a mixture consisting of 2 parts of benzoyl peroxide, 65 parts of styrene, 20 parts of methyl methacrylate, 13.3 parts of acrylic acid, 15 parts of $\beta$-hydroxyethyl acrylate and 0.45 part of lauryl mercaptan was added dropwise to the heated mixture. The resulting mixture was maintained at the same temperature, and cooled. Triethylamine (44 parts) and 125 parts of ditilled water were added to afford a water-soluble resin (H).

A mixture of 90 parts of water and 0.2 part of sodium laurylsulfate was heated to 70° C., and a mixture consisting of 58 parts of styrene, 30 parts of n-butyl acrylate, 2 parts of acrylic acid and 10 parts of $\beta$-hydrxyethyl acrylate was added portionwise to the heated mixture. Simultaneously, a mixture of 0.2 parts of potassium persulfate and distilled water was also added dropwise. The resulting mixture was maintained at the same temperature for 4 hours, and cooled. The pH of the mixture was adjusted to 8.0 with ammonia solution to afford an emulsion copolymer (F).

To a mixture of 100 parts of the emulsion copolymer (F) and 22 parts of distilled water, 100 parts of the water-soluble resin (H) was added, and they were mixed with each other. The resulting composition was milky white, and had a viscosity of 5,500 centipoises, a solids content of 45% and a pH of 8.7.

A solution of a water-soluble methyl-etherified melamine resin (solids content 60%) was added to the composition with the solids ratio of the former to the latter being adjusted to 15:85. Titanium dioxide was further added to form a white enamel (PWC 40%). The enamel was coated on a mild steel panel, and baked at 120° C. for 20 minutes. The properties of the resulting coated film were as shown in Table 6.

Table 6

| | |
|---|---|
| 60° Specular gloss | 93 |
| Pencil hardness | H |
| Impact resistance | more than 50 cm |
| Water resistance | no change |
| Gasoline resistance | no change |
| Salt spray resistance | 1.5 mm |

In the above Examples, the properties of the coatings were measured by the following methods.

60° Specular Gloss

Using a reflection index measuring apparatus, the index of reflection of the sample coating was measured while setting the angle of incidence and the angle of reflection from a light source both at 60°. When light is perfectly reflected, this value is 100.

Erichsen

An 8 mm-thick mild rolled steel panel coated with the resin composition on one surface was fixed, and pushed from the side of the uncoated surface at a speed of 0.1 mm/second by a punch having a diameter of 20 mm at right angles to the surface, until cracks occurred in the coating. The distance over which the steel panel was pushed during this time was measured.

Impact resistance

A stell ball of ½ inch in diameter was placed on the coating and a load weighing 500 g was let fall on the steel ball from various heights. The drop height of the load at a time when the coating peeled off from the substrate was measured.

Salt spray resistance

The coated surface of the sample was cut in an X-shape, and 5% salt water was sprayed to the coated surface at 35° C. for 96 hours (72 hours in the case of Tables 1 and 5). Then, a Cellophane tape was adhered to the cut portion, and then peeled off from it. The peel width of the coating was measured.

Sward hardness

Measured by a Sward rocker.

Water resistance

The sample was dipped in warm water at 50° C. for 96 hours (in water at 20° C. for 48 hours in the case of Tables 1 and 5), and then, the state of the coated surface was observed.

Gasoline resistance

The sample was dipped in gasoline at 20° C. for 48 hours (for 24 hours in the case of Tables 1 and 5), and then, the state of the coated surface was observed.

Pencil hardness

Pencils of various hardnesses were prepared, and the core of each pencil was sharpened so that the tip of the core was flat and the corners were sharp. The coated surface was rubbed with each of the pencils at a load of 1 kg at an angle of 45° to the coated surface. The hardness of a pencil which was the softest among those which injured the coated surface was recorded.

What we claim is:

1. A composition for water-base paints, said composition comprising (I) a water-soluble resin, and (II) a water-dispersible polymer containing at least one member selected from the group consisting of hydroxyl and carboxyl groups, said water-soluble resin (I) being obtained by polymerizing (1) 50 to 99.5% by weight of an alkyl ester of an $\alpha,\beta$-monoethylenically unsaturated acid or an alkenyl benzene, (2) 0.5 to 20% by weight of an $\alpha,\beta$-monoethylenically unsaturated acid and (3) 0 to 30% by weight of a hydroxyalkyl ester of an $\alpha,\beta$-monoethylenically unsaturated acid in the presence of (4) at least one unsaturated compound selected from the group consisting of alkyd resins containing a polymerizable unsaturated group, epoxy esters containing a polymerizable unsaturated group, drying oils, fatty acids of drying oils and diene polymers, and water-solubilizing the product with ammonia or an amine, said water-dispersible polymer (II) being obtained by emulsion polymerization of at least one member selected from the group consisting of an $\alpha,\beta$-monoethylenically unsaturated acid and a hydroxyalkyl ester of an $\alpha,\beta$-monoethylenically unsaturated acid with an ethylenically unsaturated monomer, the amount of the water-dispersible polymer (II) being 10 to 900 parts by weight per 100 parts by weight of the water-soluble resin (I).

2. The composition of claim 1 wherein the unsaturated compound is an alkyd resin containing a polymerizable unsaturated group or an epoxy ester containing a polymerizable unsaturated group.

3. The composition of claim 1 wherein the unsaturated compound is a drying oil, a fatty acid of a drying oil, or a diene polymer.

4. The composition of claim 1, wherein the weight ratio of the unsaturated compound (4), to the monomeric mixture of (1), (2) and (3) is from 90:10 to 20:80.

5. The composition of claim 1, wherein the water-soluble resin (I) is obtained by polymerizing (1) 65 to 95% by weight of an alkyl ($C_1$–$C_8$) ester of an $\alpha,\beta$-monoethylenically unsaturated carboxylic acid or an alkenyl ($C_2$–$C_3$) benzene, (2) 5 to 15% by weight of an $\alpha,\beta$-monoethylenically unsaturated carboxylic acid and (3) 0 to 30% by weight of a hydroxyalkyl ($C_2$–$C_4$) ester of an $\alpha,\beta$-monoethylenically unsaturated carboxylic acid in the presence of (4) said at least one unsaturated compound, the weight ratio of (4) to the monomeric mixture of (1), (2) and (3) being from 70:30 to 30:70.

6. The composition of claim 5, wherein the amount of the hydroxyalkyl ester of an $\alpha,\beta$-monoethylenically unsaturated acid (3) is 8 to 20% by weight, said composition further comprising (III) at least one crosslinking component selected from the group consisting of amino resins, blocked isocyanate compounds and epoxy resins in an amount of 5 to 65 parts by weight per 100 parts by weight of the total solids of the water-soluble resins (I) and the water-dispersible polymer (II).

7. The composition of claim 6, wherein the crosslinking component (III) is a hydroxyl-reactive compound and the water-dispersible polymer (II) contains both carboxyl and hydroxyl functional groups, the carboxyl content of the water-dispersible polymer (II), in terms of the proportion of the $\alpha,\beta$-monoethylenically unsaturated acid content of the entire monomers is 0.5 to 10% by weight and the hydroxyl content of the water-dispersible polymer (II), in terms of the proportion of the $\alpha,\beta$-monoethylenically unsaturated acid hydroxyalkyl ester is from 0.5 to 20% by weight.

8. The composition of claim 1, wherein the water-dispersible polymer (II) is an acrylic or butadiene copolymer.

9. The composition of claim 1, wherein the amount of the water-dispersible polymer (II) is 40 to 250 parts by weight per 100 parts by weight of the water-soluble resin (I).

10. The composition of claim 1, wherein the amount of the water-dispersible polymer (II) is 70 to 110 parts by weight per 100 parts by weight of the water soluble resin (I).

11. A composition for water-base paints, said composition comprising (I) a water-soluble resin, (II) a water-dispersible polymer containing at least one member selected from the group consisting of hydroxyl and carboxyl groups, and (III) at least one crosslinking component selected from the group consisting of amino resins, blocked isocyanate compounds and epoxy resins, said water-soluble resin (I) being obtained by polymerizing (1) 50 to 99.5 by weight of an alkyl ester of an $\alpha,\beta$-monoethylenically unsaturated acid or an alkenylbenzene, (2) 0.5 to 20% by weight of an $\alpha,\beta$-monoethylenically unsaturated acid and (3) 0 to 30% by weight of a hydroxyalkyl ester of an $\alpha,\beta$-monoethylenically unsaturated acid in the presence of (4) at least one unsaturated compound selected from the group consisting of alkyd resins containing a polymerizable unsaturated group, epoxy esters containing a polymerizable unsaturated group, drying oils, fatty acids of drying oils and diene polymers, and water-solubilizing the product with ammonia or an amine, said water-dispersible polymer (II) being obtained by emulsion polymerization of at least one member selected from the group consisting of an $\alpha,\beta$-monoethylenically unsaturated acid and a hydroxyalkyl ester of an $\alpha,\beta$-monoethylenically unsaturated acid with an ethylenically unsaturated monomer, the amount of the water-dispersible polymer (II) being 10 to 900 parts by weight per 100 parts by weight of the water-soluble resin (I).

12. The composition of claim 11 wherein the unsaturated compound is an alkyd resin containing a polymerizable unsaturated group or an epoxy ester containing a polymerizable unsaturated group.

13. The composition of claim 11 wherein the unsaturated compound is a drying oil, a fatty acid of a drying oil, or a diene polymer.

14. The composition of claim 11 wherein the water-soluble resin (I) is a resin prepared by using 8 to 20% by weight of a hydroxyalkyl ester of an $\alpha,\beta$-monoethylenically unsaturated acid as one monomer, the water-dispersible polymer (II) contains both a hydroxyl group and a carboxyl group, and the crosslinking component (III) is an amino resin.

15. The composition of claim 11, wherein the weight ratio of (4) to the monomeric mixture (1), (2) and (3) is from 90:10 to 20:80.

16. The composition of claim 11, wherein the water-soluble resin (I) is obtained by polymerizing (1) 65 to 95% by weight of an alkyl ($C_1$–$C_8$) ester of an $\alpha,\beta$-monoethylenically unsaturated carboxylic acid or an alkenyl ($C_2$–$C_3$) benzene, (2) 5 to 15% by weight of $\alpha,\beta$-monoethylenically unsaturated carboxylic acid and (3) 0 to 30% by weight of a hydroxyalkyl ($C_2$–$C_4$) ester of an $\alpha,\beta$-monoethylenically unsaturated carboxylic acid, in the presence of (4) said at least one unsaturated compound, the weight ratio of (4) to (1), (2) and (3) being from 70:30 to 30:70.

17. The composition of claim 11, wherein the amount of crosslinking component (III) is from 5 to 65 parts by weight per 100 parts by weight of the total solids of the water-soluble resin (I) and the water-dispersible polymer (II).

18. The composition of claim 11, wherein the amount of the crosslinking component (III) is 10 to 35 parts by weight per 100 parts by weight of the total solids of the water-soluble resin (I) and the water-dispersible polymer (II).

* * * * *